(12) United States Patent
Valvassori et al.

(10) Patent No.: US 11,392,443 B2
(45) Date of Patent: Jul. 19, 2022

(54) HARDWARE REPLACEMENT PREDICTIONS VERIFIED BY LOCAL DIAGNOSTICS

(71) Applicant: Hewlett-Packard Development Company, L.P., Spring, TX (US)

(72) Inventors: Carlos Silvano Valvassori, Porto Alegre (BR); Leonardo Rodriguez Heredia, Porto Alegre (BR); Augusto Queiroz de Macedo, Porto Alegre (BR); Marina Pasquali, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,532

(22) PCT Filed: Sep. 11, 2018

(86) PCT No.: PCT/US2018/050531
§ 371 (c)(1),
(2) Date: Oct. 14, 2020

(87) PCT Pub. No.: WO2020/055386
PCT Pub. Date: Mar. 19, 2020

(65) Prior Publication Data
US 2021/0191799 A1 Jun. 24, 2021

(51) Int. Cl.
*G06F 11/07* (2006.01)
*G06N 20/00* (2019.01)
*G05B 23/02* (2006.01)

(52) U.S. Cl.
CPC .......... *G06F 11/079* (2013.01); *G05B 23/024* (2013.01); *G05B 23/0283* (2013.01);
(Continued)

(58) Field of Classification Search
CPC .. G06F 11/079; G06F 11/0709; G06F 11/076; G05B 23/024; G05B 23/0283; G05B 2223/04; G06N 20/00
See application file for complete search history.

(56) References Cited

U.S. PATENT DOCUMENTS 6,782,345 B1 * 8/2004 Siegel ................. G06F 11/0733
702/183
7,146,542 B2 12/2006 Srinivasan et al.
(Continued)

FOREIGN PATENT DOCUMENTS

CN 104142664 B 5/2017
RU 2451874 C1 5/2012
(Continued)

OTHER PUBLICATIONS

"HDD Test and Diagnostic Software for Windows. Bad Sectors Fixing Tools", Jan. 12, 2017, HowToRecover.me.

*Primary Examiner* — Jonathan D Gibson
(74) *Attorney, Agent, or Firm* — Perry + Currier Inc

(57) ABSTRACT

An example of a server including a communication interface to receive telemetry data from a plurality of client devices. The telemetry data is to indicate a health of a client device from the plurality of client devices. The server further includes a prediction engine to process the telemetry data to determine the health of the client device with a prediction model to identify a hardware issue at the client device. The server also includes a diagnostic evaluator in communication with the prediction engine. The diagnostic evaluator is to request a local confirmation of the hardware issue from the client device upon identification of the hardware issue by the prediction engine. The local confirmation is determined at the client device via a diagnostic engine. The server also includes a reporter to report the hardware issue upon receipt of the local confirmation.

13 Claims, 5 Drawing Sheets

(52) U.S. Cl.
CPC ........ *G06F 11/076* (2013.01); *G06F 11/0709* (2013.01); *G06N 20/00* (2019.01); *G05B 2223/04* (2018.08)

(56) References Cited

U.S. PATENT DOCUMENTS

| | | | |
|---|---|---|---|
| 7,434,097 | B2 | 10/2008 | Guha et al. |
| 7,647,131 | B1 * | 1/2010 | Sadowski ............... G06F 21/82 |
| | | | 700/108 |
| 7,908,526 | B2 | 3/2011 | Guha |
| 7,971,093 | B1 | 6/2011 | Goel et al. |
| 8,204,717 | B2 | 6/2012 | McLaughlin et al. |
| 9,542,296 | B1 | 1/2017 | Engers et al. |
| 9,916,194 | B2 * | 3/2018 | Pang ....................... G06F 11/34 |
| 2015/0046756 | A1 | 2/2015 | Sreekumaran et al. |
| 2016/0205189 | A1 | 7/2016 | Mopur et al. |
| 2016/0335151 | A1 * | 11/2016 | Swierk ................... G06F 21/50 |
| 2017/0031741 | A1 * | 2/2017 | Seigel ................. G06F 11/0709 |
| 2017/0364401 | A1 | 12/2017 | Huang et al. |
| 2018/0114120 | A1 * | 4/2018 | Bostick ................. G06N 20/00 |
| 2019/0188584 | A1 * | 6/2019 | Rao ........................ G06Q 10/00 |
| 2019/0205232 | A1 * | 7/2019 | Ayyagari ............ G06F 11/2205 |
| 2019/0361759 | A1 * | 11/2019 | Haugen ............... H04L 41/0631 |
| 2020/0074078 | A1 * | 3/2020 | Saxe ...................... G06F 21/554 |
| 2020/0293033 | A1 * | 9/2020 | He ........................ G06N 3/088 |
| 2021/0191799 | A1 * | 6/2021 | Valvassori .......... G06F 11/0709 |

FOREIGN PATENT DOCUMENTS

| | | |
|---|---|---|
| WO | WO-2012151150 A1 | 11/2012 |
| WO | WO-2016112058 A1 | 7/2016 |

\* cited by examiner

HARDWARE REPLACEMENT PREDICTIONS VERIFIED BY LOCAL DIAGNOSTICS

BACKGROUND

Various devices and apparatus have parts or components with an undetermined life expectancy. The parts or components may fail periodically leading to the parts or components to be replaced. Component failure may be a predicted in some instances allowing for pre-emptive replacement of hardware components prior to failure. Accordingly, telemetry data may be collected at a device for use in making a prediction.

BRIEF DESCRIPTION OF THE DRAWINGS

Reference will now be made, by way of example only, to the accompanying drawings in which.

DETAILED DESCRIPTION

Figure 1:
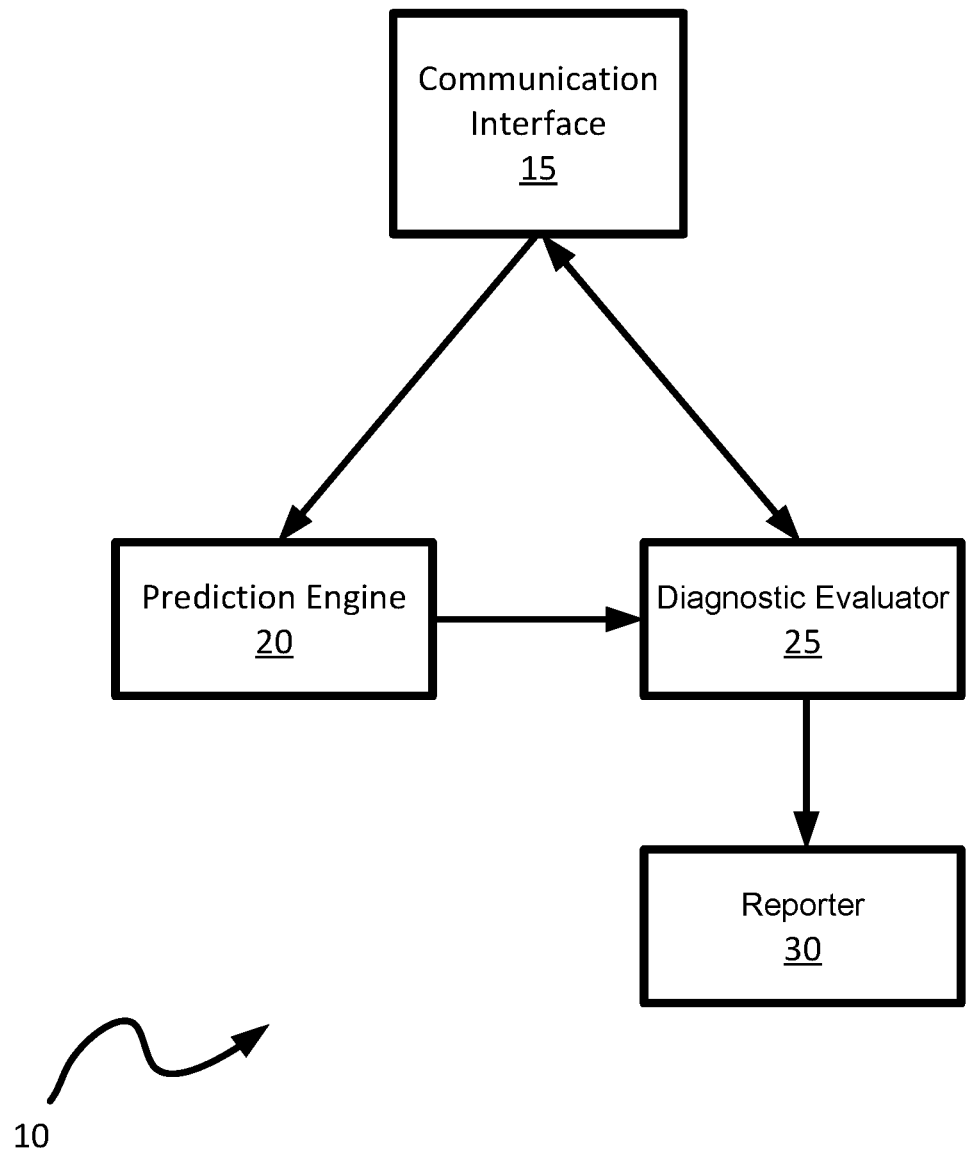
FIG. 1 is a block diagram of an example server to monitor parts or components of a device.

Devices connected to a network may be widely accepted and may often be more convenient to use. In particular, new services have developed to provide devices as a service where a consumer simply uses the device while a service provider maintains the device and ensures that its performance is maintained at a certain level.

With repeated use of any device over time, the device uses various parts or components that may wear down over time and eventually fail. Failure of a part in any device may result in significant effects for a consumer since the consumer may generally rely on the device, such as to operate a business or generate output for consumption. When a device fails, the device is to be taken offline and the down time used to diagnose the problem and to identify the cause of the failure. Subsequently, the device may be repaired, which may include the replacement of a part or component of the device. In some instances, the failure of a component may result in unintended side effects where additional components are damaged. In addition, if the failed part or component is not known, repair and replacement of the part or component is not possible.

To reduce the amount of downtime of a device, some parts and components may have estimated life expectancies measured in time, usage, or a combination of both. Accordingly, parts and components may be preemptively replaced to reduce the likelihood of downtime affecting the device. In order to reduce downtime, the estimated life expectancies of parts may be lower than the actual life expectancy to decrease the probability of a premature failure. Even with the reduced estimated life expectancies, parts or components may fail before its estimated life expectancy. This may cause the device to go out of service during the diagnosis and repair or replacement of the failed part.

In some instances, telemetry data may be collected at a device and forwarded to a central server to identify parts or components that are to be replaced. The telemetry data may be data associated with the wear on the part or component, such as the cumulative operational time, or other measure. In other examples, the telemetry data may include measurements of a component, such as data integrity, or electrical properties of the part or component. In many examples, it is to be appreciated that telemetry data is collected using a background process that does not significant affect the performance of the device which may be running other applications. It is to be appreciated that the telemetry data may not provide a definitive predictor that a part or component is to imminently fail. Accordingly, the central server may identify a part or component for replacement prematurely resulting in replacing a part or component well before it is to fail. In the present example, once the central server predicts a part or component of the device is about to fail based on telemetry data, the central server requests a further deep diagnosis be carried out at the device. The deep diagnostic may be carried out on a specific part or component using a local process that may assess the health of the part or component more accurately than the telemetry data collected using a background process.

Referring to FIG. 1, an example of a server of a hardware replacement prediction system to monitor parts or components of a device is generally shown at 10. The server 10 may include additional components, such as various memory storage units, interfaces to communicate with other devices, and further input and output devices to interact with an administrator with access to the server 10. In addition, input and output peripherals may be used to train or configure the server 10 as described in greater detail below. In the present example, the server 10 includes a communication interface 15, a prediction engine 20, a diagnostic evaluator 25, and a reporter 30. Although the present example shows the prediction engine 20, the diagnostic evaluator 25, and a reporter 30 as separate components, in other examples, the prediction engine 20, the diagnostic evaluator 25, and a reporter 30 may be part of the same physical component such as a microprocessor configured to carry out multiple functions.

The communications interface 15 is to communicate with devices over a network. In the present example, the server 10 may be in the cloud to manage a plurality of client devices. Accordingly, the communications interface 15 may be to receive telemetry data several different client devices which the server 10 manages. The telemetry data may be to indicate of the health of a client device. The manner by which the communications interface 15 receives the telemetry data is not particularly limited. In the present example, the server 10 may be a cloud server located at a distant location from the client devices which may be broadly distributed over a large geographic area. Accordingly, the communications interface 15 may be a network interface communicating over the internet. In other examples, the communication interface 15 may connect to the client devices via a peer to peer connection, such as over a wire or private network.

In the present example, the telemetry data collected is not particularly limited. For example, the telemetry data may include system device information, such as account name, model, manufacturer, born on date, type, etc., hardware information, such as smart drive information, firmware revision, disk physical information like model, manufacturer, self-test results, and cell voltage. The telemetry data may be collected using a background process at the client device. The background process may use little resources such that it does not substantially affect foreground processes running on the device. The telemetry data may be received by the communications interface 15 at regularly scheduled intervals. For example, the telemetry data may be received once a day. In other examples, the telemetry data may be received more frequently, such as every hour, or less frequently, such as every week.

The prediction engine 20 is to process the telemetry data to determine the health of the client device from which the telemetry data was received. In particular, the prediction engine 20 is to apply a prediction model to identify a potential hardware issue at the client device. The identification of the hardware issue may include the determination of a remaining life expectancy. In the present example, the prediction engine 20 may flag a component with an expected failure and continue to monitor other parts and components to aggregate multiple issues before presenting to a user of the client device. By aggregating the issues, it is to be appreciated that the user of the device may be subjected to fewer requests for a deep or heavy diagnosis carried out the client device. Accordingly, this may lead to less interruptions for the user and an improved user experience. In other examples, the prediction engine 20 may immediately provide an indication of a potential hardware failure.

The prediction model used by the prediction engine 20 is not particularly limited. In the present example, the prediction engine 20 may use a rules-based prediction method where the telemetry data is applied to various rules to determine whether the part or component from which the telemetry data was collected will develop a hardware issue. In other examples, machine learning models may be used to predict potential hardware failures. For example, the prediction model may be a neural network or a classifier model. In particular, the prediction model may include support vector machines, random forest trees, Naïve Bayes classifiers, recurring neural networks, and other types of neural networks.

The diagnostic evaluator 25 is to receive a message from the prediction engine 20 to indicate a potential hardware failure has been predicted at a client device based on an application of the prediction model to the telemetry data received from the client device. In the present example, upon receiving the message from the prediction engine 20 of a request for a local confirmation of the hardware issue identified by the prediction engine 20 is sent to the client device. In the present example, the request for local confirmation from the local device may cause the client device to carry out a deep or heavy diagnostic process on the identified component. For example, the diagnostic process may be carried out via a local diagnostic engine described in greater detail below.

In the present example, the diagnostic engine may lock out the client device such that no other applications may be used by the user of the client device. Accordingly, it is to be appreciated that by running the heavy diagnostic process, the user of the client device may be inconvenienced. Therefore, to improve the user experience, the diagnostic evaluator 25 may further generate a message and transmit the message to explain the potential hardware issue to the user. The message may also include additional advice for the user, such as to connect the client device to a power source. The message may then be displayed by the client device to the user. In this example, the message may solicit a response from the user of the client device to run the diagnostic process to collect diagnostic data for providing the local confirmation. If the user fails to provide authorization, such as when a user does not want to be interrupted during use of the client device, the diagnostic evaluator 25 may re-send the message or generate follow-up messages periodically for the client device until the user provides authorization.

In other examples, the diagnostic evaluator 25 may not seek user authorization and the message provided to the client device may be informational. Accordingly, the client device may then be forced into a diagnostic process and lock out the user from all other functionality. In further examples, the diagnostic evaluator 25 may solicit a response for a predetermined number of times and then force the client device to lock out the user after no authorization is received. The diagnostic evaluator 25 may also determine to lock out the user of the client device when a serious issue is predicted by the prediction engine 20 and solicit a response when a less serious issued is predicted.

The reporter 30 is to report the hardware issue upon receiving local confirmation from the client device. The manner by which the reporter 30 reports the hardware issue is not limited. For example, the reporter 30 may generate a ticket in the server 10 which is to be acted on upon by a technician to repair or replace the hardware of the client device. In other examples, the reporter 30 may send a message to another server for further processing to determine a course of action to take to solve the hardware issue.

Figure 2:
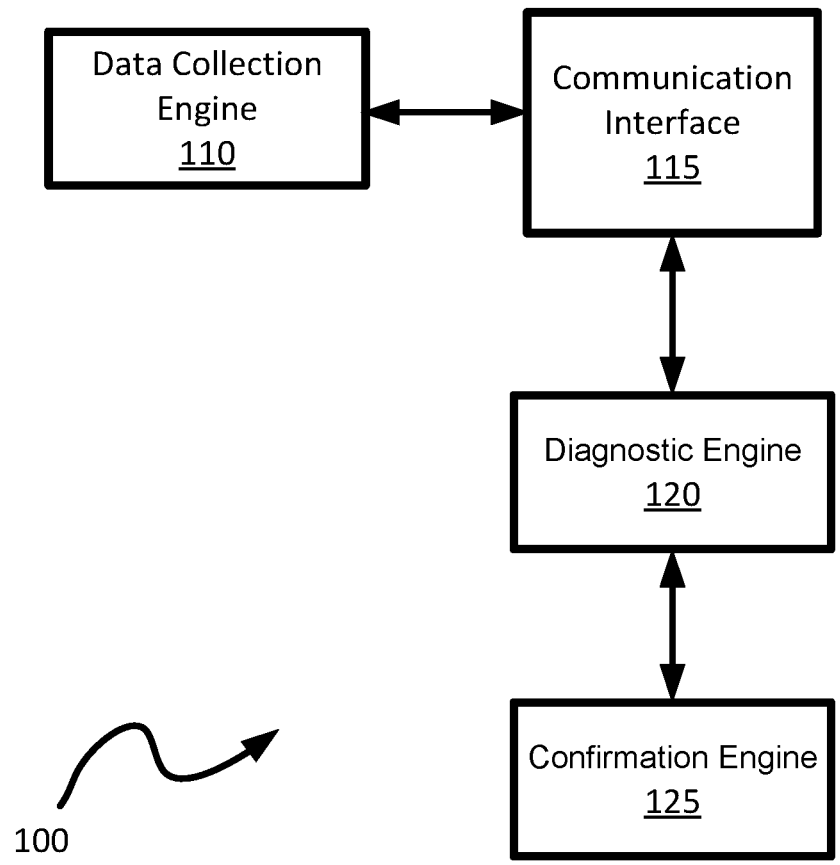
FIG. 2 is a block diagram of an example device to monitor carry out a local diagnostic of a component.

Referring to FIG. 2, an example of a device of a hardware replacement prediction system to monitor parts or components is generally shown at 100. The device 100 may be a client device or any other device connected to the server 10, such as a shared device like a scanner or printer. The device 100 may include additional components, such as various memory storage units, interfaces to communicate with other devices, and may include peripheral input and output devices to interact with a user. In the present example, the device 100 includes a data collection engine 110, a communication interface 115, a diagnostic engine 120, and a confirmation engine 125. Although the present example shows the data collection engine 110, the communication interface 115, the diagnostic engine 120, and the confirmation engine 125 as separate components, in other examples, the data collection engine 110, the communication interface 115, the diagnostic engine 120, and the confirmation engine 125 may be part of the same physical component such as a microprocessor configured to carry out multiple functions.

The data collection engine 110 is to collect telemetry data from a plurality of components within the device 100. The components from which the data collection engine 110 collects data are not limited and may include components such as memory storage devices (e.g. a hard drive, a solid-state drive, a non-volatile memory controller), batteries, displays, processors, applications, or other software running on the device 100. In the present example, the data collection engine 110 operates as a background process during normal operation of the device 100 to collect the telemetry data. The background process may use a small amount of processor resources such that the background process does not substantially affect foreground processes running on the device 100. The telemetry data may be automatically transmitted to the central server 10 via the communications interface 115 at regular intervals. For example, the telemetry data may be transmitted once a day from the device 100. In other examples, the telemetry data may be transmitted more frequently, such as every hour, for components subjected to more rapid changes, or less frequently, such as every week, for more stable components.

The communications interface 115 is to communicate with the server 10 over a network. In the present example, the device 100 may be connected to a cloud to be managed by the server 10 in the cloud. Accordingly, the communications interface 115 may be to transmit telemetry data to indicate of the health of a client device 100 for further processing by the server 10. The manner by which the communications interface 115 transmits the telemetry data is not particularly limited. In the present example, the device 100 may connect with the server 10 at a distant location over a network, such as the internet. In other examples, the communication interface 115 may connect to the server 10 via a peer to peer connection, such as over a wire or private network. In the present example, the server 10 is a central server. However, in other examples, the server 10 may be a virtual server existing in the cloud where functionality may be distributed across several physical machines.

The diagnostic engine 120 is to carry out a diagnostic process on a component of the device 100 upon receiving a request from the server 10 via the communication interface 115. In the present example, the diagnostic engine 120 is to carry out a deep or heavy diagnostic process on the component. The diagnostic process is to examine the health of the component using various measurements to compare against known performance metrics. Accordingly, it is to be appreciates that the diagnostic engine 120 carries out a significantly more resource intensive process than the collection of telemetry data by the data collection engine 110.

In the present example, the diagnostic engine 120 may lock out a user from the device 100 such that no other applications may running concurrently. Accordingly, it is to be appreciated that the diagnostic engine 120 may be inconvenience users of the device 100. To improve user experience, the diagnostic engine 120 may also receive a message from the server 10 to explain the potential hardware issue to the user. This message may then be rendered on a display (not shown) of the device for a user to review. In the present example, the message may also include additional advice for the user, such as to connect the device 100 to a power source such that the diagnostic engine 120 does not encounter issues with the device 100 running out of power. Furthermore, the message may solicit a response from the user of the device 100 to run the diagnostic process to collect diagnostic data for providing the local confirmation of a hardware issue. If the user fails to provide authorization, such as when a user does not want to be interrupted during use of the device 100, the diagnostic engine 120 may receive additional messages periodically to request authorization from the user.

In other examples, it is to be appreciates that the diagnostic engine 120 may also generate messages for the user to explain the process. In such examples, the device 100 may include a memory storage unit including code to interpret the request from the server such that an appropriate message is generated by the diagnostic engine 120 for the user of the device 100 to improve the user experience.

The confirmation engine 125 is to evaluate the diagnostic data to determine the condition of the component from which the diagnostic data is collected. In particular, the confirmation engine 125 may confirm whether the component is operating normally or about to fail. If the component of the device 100 is about to fail as predicted by the prediction engine 20, the confirmation engine 125 will generate a confirmation message and send the confirmation to the server 10.

In some examples, the diagnostic engine 120 may receive a request for the diagnostic process to be carried out on the components of the device 100 to confirm that there are no hardware issues. The origin of the request is not limited and may be randomly generated at the server 10, randomly generated locally at the device 100, or generated based on input received from a user. The diagnostic data collected by the diagnostic engine 120 is used to subsequently confirm that the last set of telemetry data sent by the data collection engine 110 does not correspond to a hardware issue. Accordingly, this may be used to train the prediction model to improve performance of the prediction engine 20 upon receipt of telemetry data.

Figure 3:
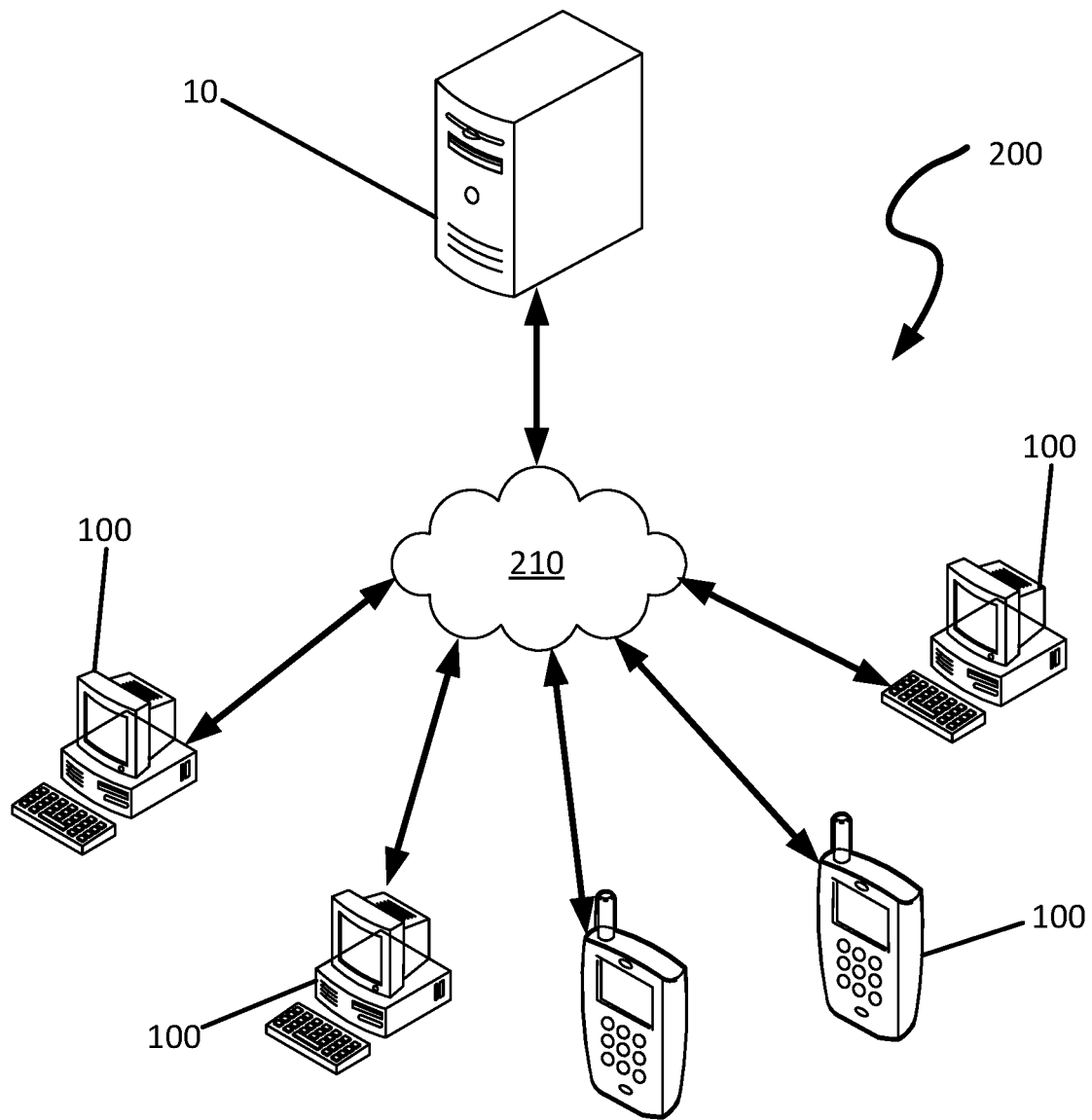
FIG. 3 is a representation of an example system to monitor parts of a device by a server in the cloud.

Referring to FIG. 3, an example of a hardware replacement prediction system to monitor parts or components of a device is generally shown at 200. In the present example, the server 10 is in communication with a plurality of devices 100 via a network 210. It is to be appreciated that the devices 100 are not limited and may be a variety of devices 100 managed by the server 10. For example, the device 100 may be a personal computer, a tablet computing device, a smart phone, or laptop computer.

Figure 4:
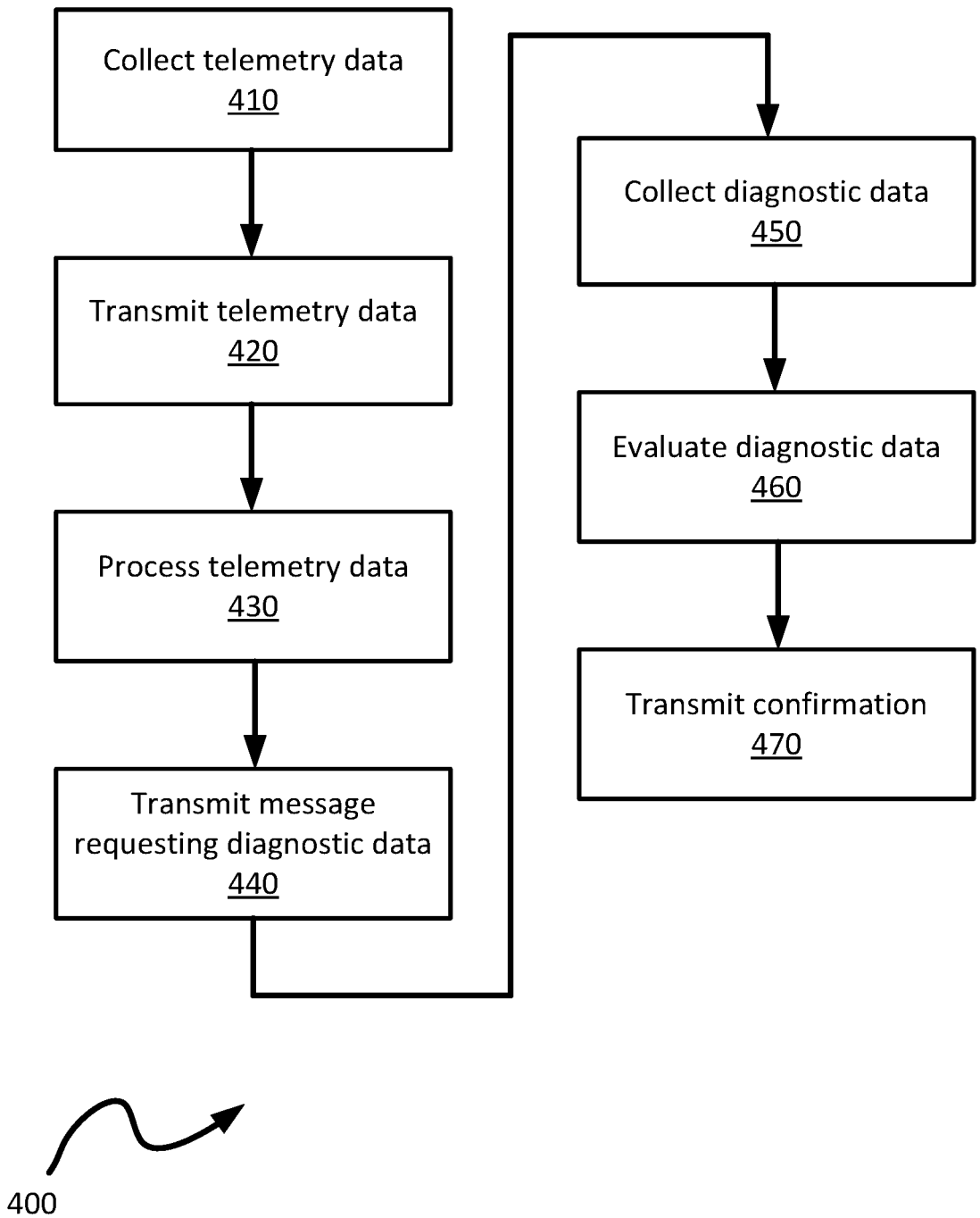
FIG. 4 is a flowchart of an example method of monitoring parts or components of a device by a server in the cloud.

Referring to FIG. 4, a flowchart of an example method of hardware replacement prediction is generally shown at 400. In order to assist in the explanation of method 400, it will be assumed that method 400 may be performed with the system 200. Indeed, the method 400 may be one way in which system 200 along with a server 10 and device 100 may be configured. Furthermore, the following discussion of method 400 may lead to a further understanding of the system 200 and the server 10 and device 100. In addition, it is to be emphasized, that method 400 may not be performed in the exact sequence as shown, and various blocks may be performed in parallel rather than in sequence, or in a different sequence altogether.

Beginning at block 410, telemetry data is collected from a plurality of components in the device 100. In the present example, the data collection engine 110 is used to collect the telemetry data using a background process. The components from which the data collection engine 110 collects data are not limited and may include components such as memory storage devices (e.g. a hard drive), batteries, displays, processors, applications, or other software running on the device 100. The background process carried out by the data collection engine uses a relatively small amount of processor resources such that the background process does not substantially affect foreground processes running on the device 100. Accordingly, a user of the device 100 may not notice that telemetry data is being collected during normal use of the device.

As an example of telemetry data collected, it may be assumed that the device 100 includes a hard drive equipped with self-monitoring, analysis and reporting technology. In this example, the hard drive will provide telemetry data that may be silently collected by the data collection engine 110 at pre-defined intervals. It is to be appreciated that the telemetry data is not particularly limited and may include system device information, such as company name, hostname, PC model, PC manufacturer, born on date, product type, etc., component information, such as smart drive information, firmware revision, sectors count, total capacity, used capacity, cell voltage, electric current, and charge capacity.

Block 420 transmits the telemetry data collected by the data collection engine 110 to the server 10 for processing. The manner by which the telemetry data is transmitted to the server 10 is not limited. For example, the telemetry data may be sent via the internet. In other examples, the device 100 may connect to the server 10 via a peer to peer connection, such as over a wire or private network. In some examples, the telemetry data may be automatically transmitted to the central server 10 via the communications interface 115 at regular intervals. For example, the telemetry data may be transmitted once a day from the device 100. In other examples, the telemetry data may be transmitted more frequently, such as every hour, for components subjected to more rapid changes, or less frequently, such as every week, for more stable components.

Block 430 involves processing the telemetry data at the server 10 to determine a health of the device 100. In particular, the prediction engine 20 of the server may process the telemetry data using a prediction model to identify a hardware issue, or potential hardware issue of a component in the device 100. In the present example, the prediction model may be a rules-based prediction model where the telemetry data is applied to various rules to determine whether the part or component from which the telemetry data was collected will develop a hardware issue. In other examples, machine learning models may be used to predict potential hardware failures. For example, the prediction model may be a neural network or a classifier model. In particular, the prediction model may include support vector machines, random forest trees, Naïve Bayes classifiers, recurring neural networks, and other types of neural networks.

Continuing with the example above of a hard drive having self-monitoring, analysis and reporting technology, the hard drive may provide telemetry data to the prediction engine 20 of the server 10. The prediction engine 20 may then apply the prediction model to determine that the hard drive has exceeded a threshold value, such as cumulative operational time. It is to be appreciated that the threshold is not limited and may be a predetermine value set by a manufacturer.

Next, block 440 transmits a message from the server 10 to the device 100. In the present example, the message may be generated by the diagnostic evaluator 25 on the server. In order to maintain a level of user satisfaction, it is to be understood that the message is to provide information to the user to explain the reasons for locking the user out as the diagnostic process is being carried out. Furthermore, block 440 may involve soliciting an authorization from the user of the device 100 to collect diagnostic data.

Returning to the present example of the hard drive, the message may notify a user of that the hard drive may have degrade. The message may explain that the hard drive may have degraded below acceptable performance standards and that a diagnosis is to be carried out to confirm. Furthermore, the message may solicit authorization from the user to take the device 100 offline temporarily while the diagnosis is carried out via a pop-up prompt. Upon receiving authorization, a follow-up message may be displayed to inform the user to not disturb the diagnosis and to ensure that the device 100 has sufficient power to carry out the diagnosis or to ensure the device 100 is connected to a power source.

Block 450 involves collecting the diagnostic data from the component identified by the prediction engine 20 upon receiving the authorization from the user. In the present example, the collection of the diagnostic data involves carrying out a diagnostic process at the device 100. In particular, the diagnostic process is a local process carried out by the diagnostic engine 120. Continuing with the hard drive example, the diagnostic engine 120 will carry out a complete disk self-test which collects various data from the hard drive. The diagnosis data to be collected from the hard drive is not limited and may include a determination of an extended self-test result, device statistics such as logical sectors written, number of read commands, temperature statistics, transport statistics, etc.

Next, block 460 involves evaluating the diagnostic data collected from block 450 to determine if the condition of the component. In the present example, the evaluation is carried out by the confirmation engine 125 on the device. In the present example, the confirmation engine 125 may have access to a database of information that outlines normal operating conditions for the component being test. Accordingly, the evaluation may involve comparing a value measured by the diagnosis engine with a stored value in the database provided by the component manufacturer or set by the administrator of the device 100. Continuing with the above example, the diagnosis data collected from the hard drive may be compared with values provided by the manufacturer to determine if the hard drive is still operating within acceptable limits.

After evaluating the diagnosis data, the confirmation engine 125 provides a confirmation of whether the component is about to fail as predicted by the prediction engine 20 on the server 10 or whether the prediction engine 20 made an incorrect prediction. The confirmation engine 125 may subsequently generate a message to be transmitted to from the device 100 to the server 10 at block 470 to provide confirmation where the server 10 may take further action to repair or replace the component of the device 100.

Figure 5:
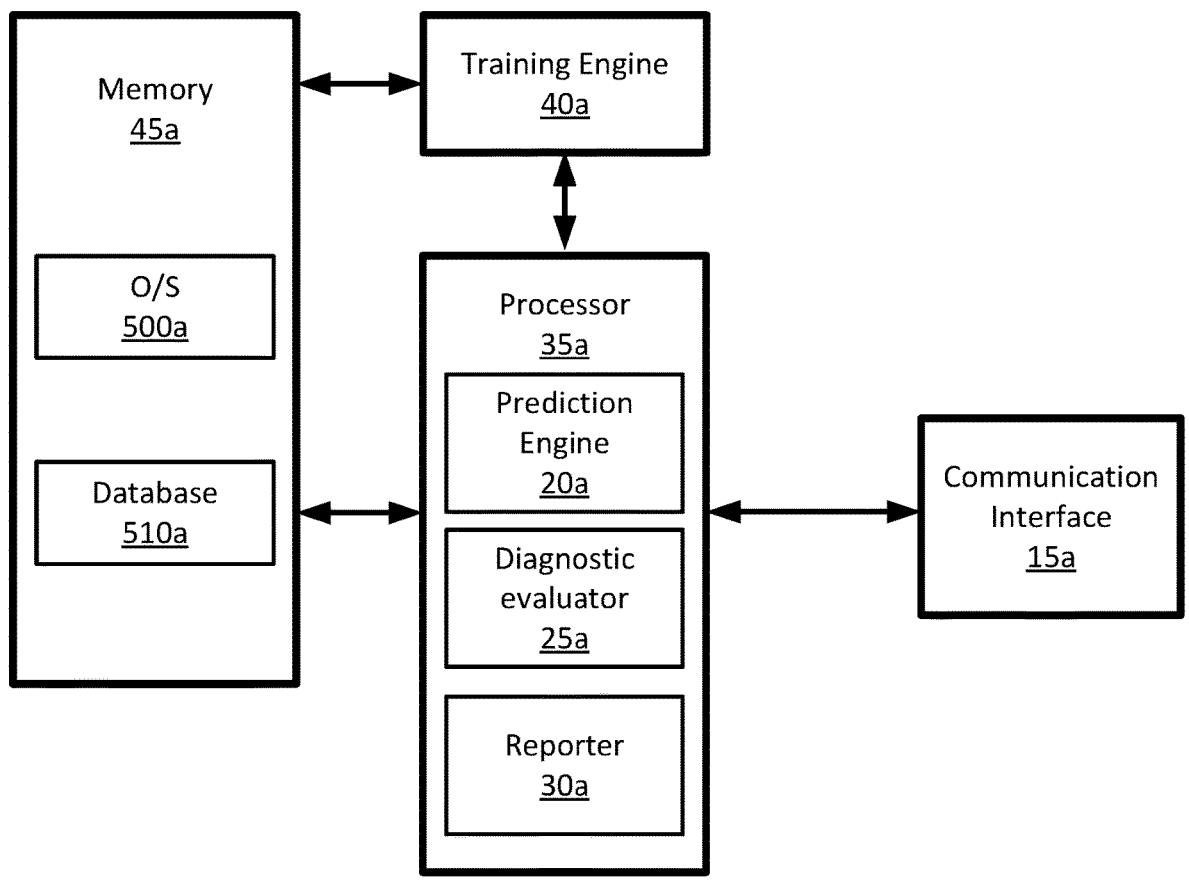
FIG. 5 is a block diagram of another example apparatus to monitor parts or components of a device.

Referring to FIG. 5, another example of a server of a hardware replacement prediction system to monitor parts or components of a device 100 is shown at 10*a*. Like components of the server 10*a* bear like reference to their counterparts in the server 10, except followed by the suffix "a". The server 10*a* includes a communication interface 15*a*, a prediction engine 20*a*, a diagnostic evaluator 25*a*, and a reporter 30*a*. In the present example, the prediction engine 20*a*, the diagnostic evaluator 25*a*, and the reporter 30*a*, are implemented by processor 35*a*. The server 10*a* further includes a training engine 40*a* and a memory storage unit 45*a*. Although the present example shows the training engine 40*a* as a separate component, in other examples, the training engine 40*a* may also be implemented by the processor 35*a*.

The processor 35*a* may include a central processing unit (CPU), a graphics processing unit (GPU), a microcontroller, a microprocessor, a processing core, a field-programmable gate array (FPGA), an application-specific integrated circuit (ASIC), or similar. The processor 35*a* and the memory storage unit 45*a* may cooperate to execute various instructions. The processor 35*a* may execute instructions stored on the memory storage unit 45*a* to carry out processes such as the method 400. In other examples, the processor 35*a* may execute instructions stored on the memory storage unit 45*a* to implement the prediction engine 20*a*, the diagnostic evaluator 25*a*, and the reporter 30*a*. In other examples, the prediction engine 20*a*, the diagnostic evaluator 25*a*, and the reporter 30*a* may each be executed on a separate processor. In further examples, the prediction engine 20*a*, the diagnostic evaluator 25*a*, and the reporter 30*a* may be operated on a separate machine, such as from a software as a service provider or in a virtual cloud server.

The training engine 40*a* is to train the prediction model used by the prediction engine based on a local confirmation received from the device 100. The manner by which the training engine 40*a* trains the prediction model is not limited and may be dependent on the prediction model used. For example, if the prediction mode is a rules-based model where the rules are stored in a database 510*a*, the local confirmation received indicating that a component is about to fail or not may be validated by the training engine 40*a* by comparing the local confirmation with the original prediction generated by the prediction engine 20*a*. In the case of any discrepancy, the database 510*a* storing the rules of the prediction model may be updated.

In some examples, the training engine 40a may solicit a response from the user of the device 100 to run the diagnostic process to collect diagnostic data for providing the local confirmation. In particular, the message may indicate that there is no predicted issue with device 100 and that the diagnostic data is for training purposes to improve the operation of the system 200. In particular, the message may indicate that participation may be voluntary.

In other examples where the prediction model involves a machine learning or artificial intelligence model, the local confirmation may be added to the database 510a as additional training data used by the training engine 40a to train the prediction model.

Various advantages will now become apparent to a person of skill in the art. For example, the system 200 may benefit from having a hardware failure prediction carried out on a server 10 based on telemetry data received from a device 100 and the benefit of have a local confirmation from the device 100 prior to implementing any corrective measures. In particular, this will increase the accuracy the prediction generated at the server to reduce unnecessary hardware replaces to reduce costs. In addition, by carrying out the local diagnosis process on healthy machines periodically, the prediction engine 20 of a server 10 may be trained to increase the accuracy of future predictions.

It should be recognized that features and aspects of the various examples provided above may be combined into further examples that also fall within the scope of the present disclosure.

What is claimed is:

1. A server comprising:
    a communication interface to receive telemetry data from a plurality of client devices, wherein the telemetry data is to indicate a health of a client device from the plurality of client devices;
    a prediction engine to process the telemetry data to determine the health of the client device with a prediction model to identify a hardware issue at the client device;
    a diagnostic evaluator in communication with the prediction engine, wherein the diagnostic evaluator is to request a local confirmation of the hardware issue from the client device upon identification of the hardware issue by the prediction engine, and wherein the local confirmation is determined at the client device via a diagnostic engine, wherein, in response to an authorization provided at the client device, the diagnostic engine is to perform a diagnosis at the client device to obtain the local confirmation;
    a training engine to train the prediction model to correlate the telemetry data to the hardware issue based on receiving the local confirmation; and
    a reporter to report the hardware issue upon receipt of the local confirmation.

2. The server of claim 1, wherein the communication interface is to receive telemetry data at regular intervals.

3. The server of claim 1, wherein the diagnostic evaluator transmits a message to display to a user, wherein the message is to solicit the authorization from the user for the client device to collect diagnostic data.

4. The server of claim 3, wherein the diagnostic evaluator periodically transmits the message until the user provides the authorization for the client device to collect diagnostic data.

5. The server of claim 1, wherein the training engine validates predictions generated by the prediction engine by comparison of an application of the prediction model to the telemetry data with the local confirmation.

6. The server of claim 5, wherein the training engine transmits a message to display to a user of the client device, wherein the message is to solicit the authorization from the user to provide the local confirmation for training purposes.

7. A device comprising:
    a data collection engine to collect telemetry data from a plurality of components, wherein the telemetry data is collected with a background process, and wherein the telemetry data is associated with the plurality of components;
    a communication interface to communicate with a central server, wherein the communication interface is to transmit the telemetry data to the central server that executes a prediction model with the telemetry data;
    a diagnostic engine to perform a diagnosis at the device to collect, upon receipt of a diagnostic request via the communication interface and upon authorization of the diagnostic request at the device, diagnostic data from a component of the plurality of components; and
    a confirmation engine to evaluate the diagnostic data to determine a condition of the component to confirm and to transmit a confirmation to the central server to train the prediction model at the central server.

8. The device of claim 7, wherein the data collection engine is to collect telemetry data to be transmitted to the central server at regular intervals.

9. The device of claim 7, further comprising a display to output a message to a user, wherein the message is to solicit the authorization from the user to collect the diagnostic data.

10. The device of claim 9, wherein diagnostic request is to request the confirmation engine to confirm the component is healthy to train the prediction model on the central server.

11. The device of claim 10, wherein telemetry data collected by the data collection engine is to be used as training data for the prediction model.

12. A method comprising:
    collecting telemetry data from a plurality of components on a client device wherein the telemetry data is collected with a background process;
    transmitting the telemetry data from the client device to a central server;
    processing the telemetry data at the central server to determine a health of the client device, wherein the telemetry data is processed with a prediction model to identify a hardware issue of a component from the plurality of components;
    transmitting a message from the central server to the client device, wherein the message is to be displayed to a user, and wherein the message is to solicit authorization from the user of the client device to collect diagnostic data;
    performing a diagnosis at the client device to collect diagnostic data from the component upon receipt of the authorization;
    evaluating the diagnostic data to determine a condition of the component; and
    transmitting a confirmation from the client device to the central server to train the prediction model based on a user-authorized and confirmed diagnosis of the hardware issue.

13. The method of claim 12, wherein the collecting the telemetry data comprises collecting the telemetry data to be transmitted to the central server at regular intervals.

* * * * *